May 22, 1956 M. CAMRAS 2,747,026
RECORDING APPARATUS AND METHOD FOR MAKING
DUPLICATE MAGNETIC RECORDS
Filed Nov. 18, 1948 2 Sheets-Sheet 1

Inventor
Marvin Camras by The Firm of Charles W. Hills Attys

Inventor
Marvin Camras
by The Firm of Charles W. Hills Attys

United States Patent Office 2,747,026

Patented May 22, 1956

2,747,026

RECORDING APPARATUS AND METHOD FOR MAKING DUPLICATE MAGNETIC RECORDS

Marvin Camras, Chicago, Ill., assignor to Armour Research Foundation of Illinois Institute of Technology, Chicago, Ill., a corporation of Illinois Application November 18, 1948, Serial No. 60,652

5 Claims. (Cl. 179—100.2)

This invention relates to a recording duplicator, and more particularly, to a device for transferring magnetic patterns from a master magnetic record to a paramagnetic copy medium.

The present subject matter constitutes a continuation-in-part of that disclosed in my copending application, Serial No. 58,403, filed November 5, 1948.

In one method of magnetic recording, a lengthy magnetizable record medium is drawn across an electromagnetic transducer head assembly at substantially uniform linear velocity. The head assembly includes a magnetic core member having a non-magnetic gap over which the medium passes and which is provided with suitable current conducting exciting elements to produce a magnetic field across the gap.

During the recording operation, current is caused to flow in exciting elements in accordance with time variations of an intelligence to produce a time-varying magnetic field in the core in accordance with the value thereof. The lengthy magnetizable medium is subjected to the influence of the field as it is drawn therethrough, and magnetization is imparted to incremental lengths of the medium in accordance with time variations of the intelligence, thus causing variations in the magnetization of the medium along its length in accordance with the time variations of the intelligence.

During reproduction, the lengthy magnetizable medium is drawn across the same or similar head assembly to set up a flux in the core portions thereof in accordance with the magnetization of the medium along successive incremental lengths as it passes across the gap of the magnetic core member. The resulting time-varying flux induces voltage in the core with which the flux is linked in accordance with the time rate of change thereof. This voltage may be amplified and suitably reproduced by a loud speaker or similar device to produce the intelligence recorded.

It is well known that magnetic fields vary in relative configuration and direction depending upon the position and direction of the magnetic lines of force with respect to the dimensional axis of the magnetic recording medium. Thus, the exciting elements which produce the magnetic recording field may be arranged within the transducer head structure to produce magnetic fields which are variously identified as longitudinal fields, transverse fields, or vertical fields.

Duplicating devices constructed in accordance with the present invention utilize vertical or transverse magnetic transfer fields established by suitably arranged exciting elements to transfer a magnetic pattern initially impressed upon a master magnetic record to a paramagnetic record medium. This, therefore, constitutes one object of my invention.

A particular object of this invention is to provide a method and apparatus for transferring a magnetic pattern recorded in a magnetic field having a predetermined directional configuration to a paramagnetic copy medium by means of a magnetic transfer field having a directional configuration different from the magnetic recording field.

Another object of the present invention is to provide a duplicating device for use with a simplified reel mechanism whereby a lengthy master magnetic record and a copy medium may be drawn from storage spools in a linear path and rewound on powered or hand-operated take-up reels without the use of complicated mechanism for producing constant linear speed.

A further object of my invention is to provide means for producing duplicate magnetic recordings economically.

An important object of this invention is to provide a method and apparatus for transferring magnetic patterns with a transverse magnetic transfer field, thereby permitting an easily constructed roller type duplicating device to be employed.

Another object of my invention is to provide a mechanism employing a unique method whereby magnetic patterns present on a master record may be transferred to a paramagnetic record blank with great rapidity.

A further object of my invention is to reproduce a magnetic pattern by a contact process wherein the pattern is transferred from a master magnetic record having high coercive force by placing the master in contact with a paramagnetic copy material having a comparatively lower coercive force within a magnetic transfer field having a strength less than the coercive force of the master magnetic record.

Another object of my invention is to reproduce a magnetic pattern by a contact process wherein the pattern is transferred from a master magnetic record having high coercive force by placing the master in contact with a paramagnetic copy material having a comparatively lower coercive force within a magnetic transfer field having a strength less than the coercive force of the master magnetic record and more than the coercive force of the copy material.

Another object of my invention is to provide a duplicating device which is economical to manufacture, convenient in operation, and efficient for its intended purpose.

Other objects of my invention, the construction features and organization and methods of operation will become evident to those versed in the art through reference to the following detailed description and the appended claims, in which I have described a selected embodiment of my invention.

Figure 1:
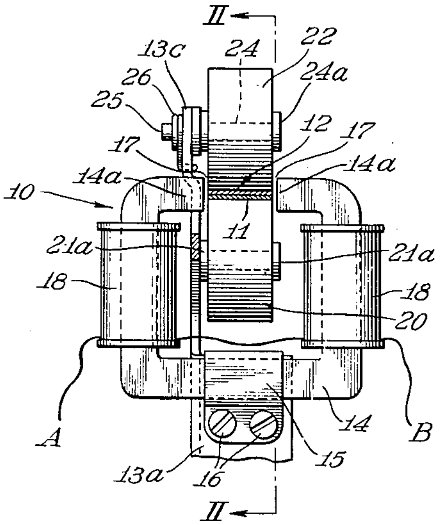
Figure 1 is an end elevational view, partly in section, illustrating a duplicating device embodying the principles of my invention.
Figure 2:
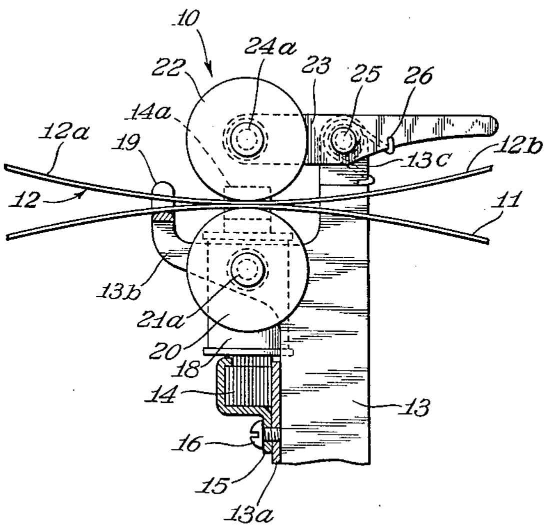
Figure 2 is a sectionalized view taken on line II—II of Figure 1.

Referring to Figures 1 and 2, a duplicating device 10 is shown transferring a magnetic pattern from a master magnetic record 11 to a paramagnetic copy medium 12.

The master magnetic record 11 is preferably a lengthy magnetic record media having a high coercive force ($H_c$) which, by way of example, may be in the range of 750–1,000 oersteds, so as to minimize the possible adverse effects of a high frequency A. C. transfer field. The master record may also have a sufficiently high retentivity ($B_r$) so as to facilitate the complete magnetization of the copy material. The master record should, in addition, have a high $H_0$ value, such value being defined as the minimum value of field where retentivity is obtained.

The paramagnetic copy medium 12 is shown as comprising a blank record portion 12*a* as before magnetic transfer and a duplicate magnetic record portion 12*b* as after magnetic transfer.

The copy medium 12 is preferably a lengthy magnetizable material similar to the master and should have a sufficiently high coercive force ($H_c$) and retentivity value ($B_r$) to give satisfactory output and frequency response when the finished duplicate magnetic record is played back in a record reproduction unit. Satisfactory results are obtainable with copy material having a coercive force as low as 100 oersteds, although a preferred copy material should have a coercive force in the range of 200–300 oersteds. The copy material should also be of low permeability so as to facilitate penetration of the magnetic field resulting from the magnetic pattern in the master and should have a high $H_0$ with low retentivity at fields below the $H_0$ value so as to minimize the possible transfer of the magnetic pattern of the duplicate record after it has been completed and coiled up on a spool.

For further information with respect to the details, characteristics, and alternative methods of construction of the master and the copy media, reference may be had to my copending application, Serial No. 58,403, filed November 5, 1948.

The record media are simultaneously drawn off of storage spools through the duplicating device by a conventional take-up reel mechanism equipped with a powered motor or manipulated by a hand crank. It may be noted at this point that it is not at all necessary that the driving mechanism draw the record media at constant linear speed, therefore, the take-up reel may be of simplified construction and may be operated to produce rapid winding in a convenient fashion. Inasmuch as the driving mechanism structure per se is not essential to the present invention, it is not shown on the drawing, and it will not be described in further detail.

Referring specifically to Figures 1 and 2, a frame 13, preferably shaped or cut of non-magnetic sheet-like metal material to define a mounting flange 13*a*, a guide arm 13*b* and a wheel mounting 13*c* is held in firm assembly with a transfer magnet 14 by a cast metal clip 15 secured to the mounting 13*a* with a plurality of screws 16. The transfer magnet may be constructed, by way of example, in the form of a transfer magnet 14 which may be laminated or of any other structure well known in the art.

The transfer magnet 14 is shown as having a pair of opposed legs 14*a* separated by an air gap 17 of sufficient width to freely pass the record media. The transfer magnet 14 is wound with a pair of coils 18 having wire leads A and B connected to a suitable source of A. C. or D. C. current or both thereby providing for selective excitation to produce an A. C. or D. C. magnetic transfer field in the area of the air gap 17.

It will be apparent that the disposition of the magnetic lines of force in the magnetic transfer field established in the area of the air gap 17 will be of such a character as to constitute a field which is transverse to the dimensional axis of the lengthy record media.

Figure 3:
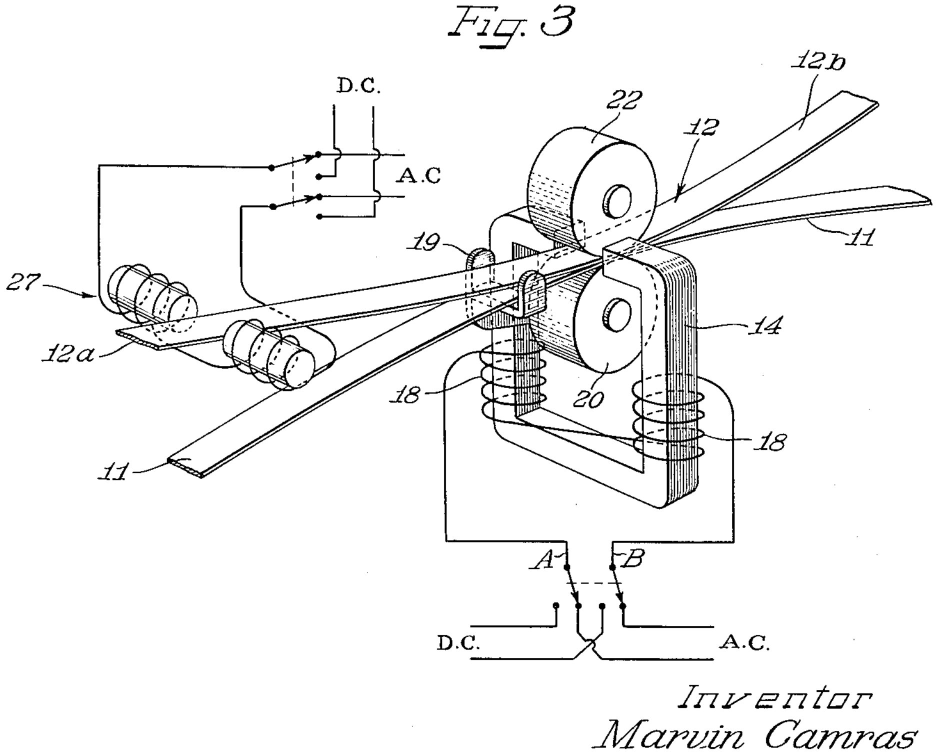
Figure 3 is a perspective view, partly diagrammatic, showing the method of operation of the device shown in Figures 1 and 2.

As may best be seen in Figure 3, the record media being introduced into the duplicating device 10 are restrained against relative transverse displacement by a guide yoke 19 situated on the end of the guide arm 13*b*.

A roller 20 made of non-magnetic material and positioned below the record media is mounted for pivotal rotation on a pin 21 which passes through the guide arm 13*b*. The pin 21 is suitably flanged as at 21*a* to retain the roller 20 in transverse alignment.

A second roller 22 also made of non-magnetic material is positioned above the record media, and is mounted for pivotal rotation on a pin 24 which passes through a lever arm 23. The pin 24 is suitably flanged as at 24*a* to retain the roller 20 in correct transverse alignment. The lever arm 23 is pivotally mounted on a pivot 25 which passes through the wheel mounting 13*c* of the frame 13.

It may be desirable to face the rollers 20, 22 with a soft material so as to promote a satisfactory contact between the master magnetic record and the copy medium within the transfer field.

A wire spring 26 is bent in a coil shape for surrounding the pivot pin 25 and has two legs extending tangentially from the coil which are bent over to form a pair of toes for engaging the frame 13 and the lever arm 23, thereby normally biasing the roller 22 into contact engagement with the roller 20. The pin 25 is suitably flanged to maintain the frame 13, the spring 26 and the lever arm 23 in correct transverse alignment.

Referring now to Figure 3, a duplicating device 10 is shown being used in conection with an erase head 27. The erase head 27 comprises a conventional air core transfer solenoid which may be selectively excited with A. C. or D. C. current and operates to remove magnetic variations from the blank record medium 12*a*.

Ideally, the present invention may be operated in accordance with two distinct methods of operation which shall be identified herein for the sake of convenience as the D. C. method and the A. C. method. It should be noted, however, that inasmuch as the various magnetic fields associated with recording a pattern upon a master record, saturating or eliminating magnetic variations from a copy material and establishing a magnetic transfer field may each be peculiarly distinct because of the particular configuration of magnetic field produced by the particular means of excitation. Thus, a large number of possible permutations and combinations may present themselves to those skilled in the art without marking a departure from the spirit of this invention.

*D. C. method*

When D. C. current is used, the erase head 27 operates to induce a condition of saturation in the record blank 12*a* by means of a D. C. magnetic field. After erasure, the record media are then introduced into the duplicating device 10 by way of the guide yoke 19.

By manipulating the lever arm 23 against the bias of the spring 26, the rollers 20 and 22 may be separated to receive the master record 11 and the copy medium 12*a*.

The coils 18 are energized for D. C. excitation and produce a transverse magnetic transfer field in the area of the air gap 17. The direction of the transfer field should be opposite that of the field used in the erase head and should preferably be of a weaker quantitative strength. The master record 11 is held in firm contact with the copy medium 12*a* while in the area of the magnetic transfer field. Since the field of the master record permeates the copy material, the vectorial summation of the various field components results in an impartation of a residual magnetization in the copy medium which is linearly proportional to the magnetization of the master. Thus, a magnetic pattern corresponding to that established in the master record is transferred to the copy medium producing a duplicate magnetic record 12*b* free of distortion which is a faithful copy of the master record 11.

*A. C. method*

When A. C. current is used, the erase head 27 operates to demagnetize the record blank 12*a* in a conventional manner with a decaying A. C. magnetic field. It will be apparent that if the record blank is known to be free of magnetization, the erasure procedure may be omitted.

After erasure, the record media are introduced into the duplicating device as before, and a transverse A. C. magnetic transfer field is established through excitation of the coils 18 with A. C. current. The vectorial summation of the components of the field of the master magnetic record and the rapidly fluctuating magnetic transfer field produces a magnetization in the copy medium which is linearly proportional to the magnetization of the master, thereby producing a duplicate record **12*b* free of distortion which is a faithful copy of the master record 12**.

Figure 4:
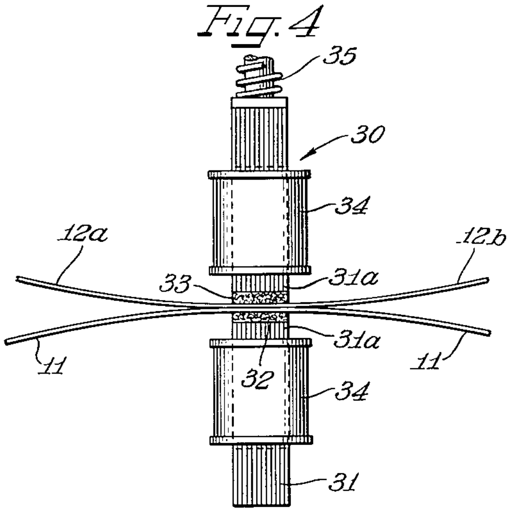
Figure 4 is an end elevation of a second duplicating device embodying the principles of my invention.
Figure 5:
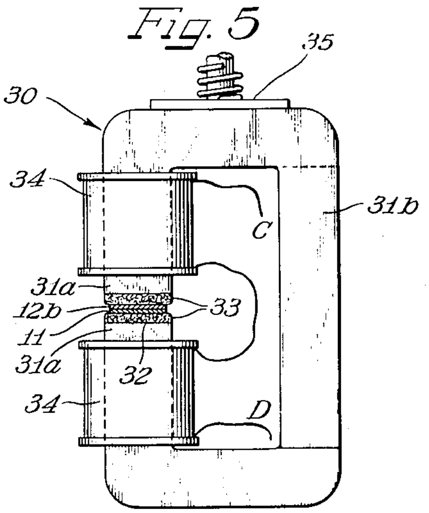
Figure 5 is a side elevation of the device shown in Figure 4.
Figure 6:
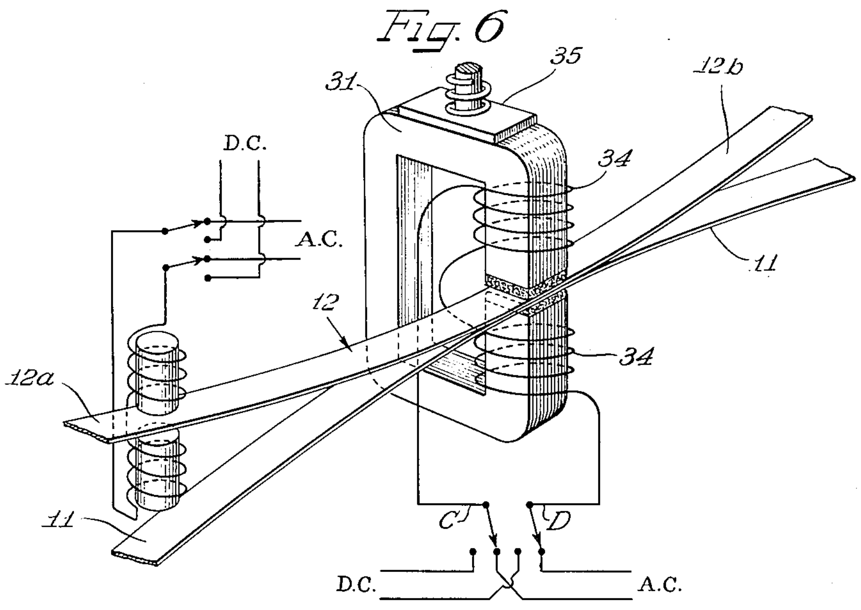
Figure 6 is a perspective view, partly diagrammatic, showing the method of operation of the device shown in Figures 4 and 5.

Turning now to Figures 4, 5 and 6, a duplicating device 30 is shown transferring a magnetic pattern from a master magnetic record 11 to a paramagnetic copy material 12 comprising a blank record portion **12*a* and a duplicate magnetic record portion 12*b***.

The duplicating device 30 comprises a transfer magnet 31 having a pair of opposed legs **31*a* separated by a non-magnetic gap 32. The transfer magnet 31 has a back portion 31*b* having interleaved laminations for making the vertical dimension of the non-magnetic gap 32 an adjustable variable. The transfer magnet may be adjustably varied with a conventional spring-press structure indicated generally at 35 which operates to collapse the transfer magnet 31 thereby adjusting the dimension of the non-magnetic gap 32**.

The ends of the opposed legs **31*a* form poles on opposite sides of the non-magnetic gap 32 and may be rounded or sharpened to a point, or various shapes may be combined, as, for example, one leg may be a flat pole and one leg may be a sharp edged pole. The present embodiment illustrates legs forming flat poles having affixed thereto blocks of felt 33 or other non-magnetic material, suitable for bearing against the record media as the transfer magnet 31 is collapsed and the record media pass through the duplicating device 30**. It may be noted that it may be desirable to tilt the pole pieces so as to define an angle with respect to the record media.

The transfer magnet 31 is wound with a pair of coils 34 connected to a suitable source of current by a pair of wire leads C and D and may be selectively excited with A. C. or D. C. current thereby establishing a magnetic transfer field in the area of the non-magnetic gap 32.

It will be apparent that the disposition of the magnetic lines of force in the magnetic transfer field established in the area of the non-magnetic gap 32 will be of such a character as to constitute a field which is vertical to the dimensional axis of the lengthy record media.

The methods of operation of the duplicating device 30 are similar to the A. C. and D. C. operations previously described in connection with the duplicating device 10. As may be seen in Figure 6, the record blank **12*a* is first "erased" after which the blank 12*a* and the master record 11 are resiliently compressed in firm contact with one another in the area of the magnetic transfer field by the coaction of the non-magnetic pads in the gap 32 and a conventional spring press 35 acting upon the collapsible interleaved transfer magnet 31**.

For a more thorough understanding of the magnetic phenomenon accompanying the transfer process and for various detailed data concerning the desirable strength of the transfer field and the characteristics of the record media, reference may be had to my co-pending application, Serial No. 58,403, filed November 5, 1948.

It should be evident that I have described a novel and improved structure employing a unique method of transferring a magnetic pattern from a master magnetic record to a paramagnetic copy medium by means of a contact process within a vertical or transverse magnetic transfer field.

While I have shown and described preferred embodiments of this invention in detail, it should be understood that various modifications may be made without departing from the spirit of my invention. I desire to be limited, therefore, only by the scope of the appended claims and the prior art.

I claim as my invention:

1. In apparatus for duplicating onto a copy magnetic record member a magnetic pattern recorded on a master magnetic record member, each of said members being longitudinally movable and having an elongated longitudinal dimension, a width dimension, and a thickness dimension, the direction of the magnetic pattern on the master record member being other than across the width thereof, a magnetic field producing head assembly including a pair of pole faces and a gap therebetween, the gap having a dimension in the direction of flux of a field produced by said head assembly at least as great as the width dimension of said members, and means juxtaposing the record members in an overlying relation to each other between said pole faces whereby the field produced by said head assembly will have a direction through the width of said record members.

2. In combination with duplicating apparatus as described in claim 1, a magnetic erase head assembly having a pair of pole faces with a gap therebetween of a dimension in the direction of flux of a field produced by the erase head at least as great as the width dimension of the copy magnetic record member, said erase head being operatively associated with said copy magnetic record member in a direction of movement of said record members ahead of the first mentioned head assembly and oriented so that the direction of flux of a field produced by said erase head assembly extends through the width of said copy magnetic record member.

3. In apparatus for duplicating as described in claim 1, means for positively aligning the record members in an overlying relation with respect to each other and means for mechanically biasing the record members towards each other as aligned by the aligning means.

4. Magnetic duplicating apparatus as described in claim 1 wherein the means juxtaposing the record members is comprised of a pair of non-magnetic rollers relatively mechanically biased towards each other between said pole faces.

5. In duplicating apparatus as described in claim 1, means for energizing the head assembly to produce a proper magnetic transfer field between said pole faces.

References Cited in the file of this patent

UNITED STATES PATENTS

| | | |
|---|---|---|
| 873,042 | Hagemann | Dec. 10, 1902 |
| 873,541 | Hagemann | Dec. 10, 1907 |
| 1,815,010 | Pollack | July 14, 1931 |
| 1,828,260 | Stille | Oct. 20, 1931 |